Patented Dec. 28, 1943

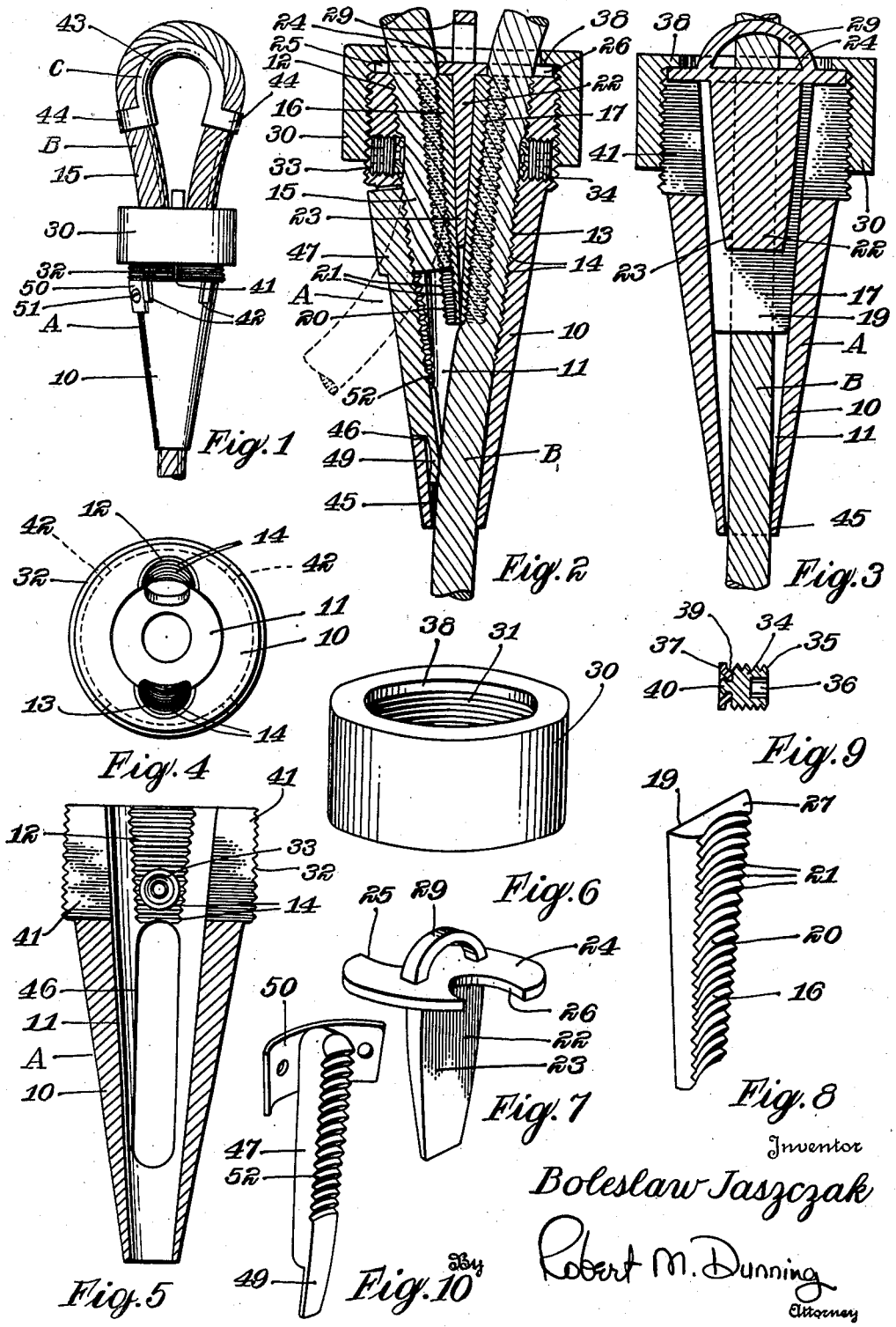

2,337,895

UNITED STATES PATENT OFFICE 2,337,895

CABLE CLAMP

Boleslaw Jaszczak, St. Paul, Minn.

Application October 17, 1942, Serial No. 462,407

12 Claims. (Cl. 24—124)

My invention relates to an improvement in cable clamp, wherein it is desired to provide a device capable of clamping the end of a flexible cable or the like.

It is an object of the present invention to provide a cable clamp capable of holding the end of a cable in loop formation so that the cable end may be readily anchored to a suitable anchoring means. In order to accomplish this result the cable preferably passes through the clamping element, is bent into loop formation, and terminally extends back into the clamping device.

A feature of the present invention lies in the fact that pull upon the cable tends to tighten the grip of the clamping device upon the cable. As pressure is exerted upon the cable, a wedge means is drawn farther into the cable clamping means, thus clamping the cable more tightly. As a result the cable will usually break before the end of the cable will be released from the clamp.

A feature of the present invention lies in the provision of a cable clamping device which is relatively smooth on its outer surface. As a result this clamping device may be used in installations where injury to health or clothing might occur from the use of a cable clamp of irregular form embodying projecting elements.

It is an important feature of the present invention that the cable passes through the body of the clamping device and the end of the cable is then looped back into the body of the device. Wedge elements are provided between the two portions of the cable enclosed within the clamping device so as to firmly clamp these portions of the cable to the clamping device.

A further feature of the present invention lies in the provision of a clamping device engaging two portions of the cable and providing jaws which are engageable with each of the cable portions enclosed. A wedge means is provided for urging the jaws into engagement with the cable. With this construction the jaws need not move relative to the cable during the wedging action, except to force the jaws into closer contact with the cable.

A further feature of the present invention lies in the provision of a wedge-shaped clamping element which is provided with a means to facilitate the removal of the wedge when the clamp is disassembled. With this construction the end of the clamping device may be removed or inserted in an extremely short period of time.

A further feature of the present invention lies in the provision of set screws which may engage the surface of the cable, and in providing clamping plates on these set screws which do not rotate with the set screws. As a result the insertion or removal of the set screws does not cause injury to the portion of the cable engaged due to a rotary cutting movement of the ends of the set screws.

These and other objects and novel features of my invention will be more clearly and fully set forth in the following specification and claims.

In the drawing forming a part of my specification:

Figure 1 is a side elevational view of my cable clamp showing my new construction.

Figure 2 is a longitudinal section through the cable clamp shown in Figure 1.

Figure 3 is a longitudinal section through the clamping device, this section being taken on a plane at right angles to the section shown in Figure 2.

Figure 4 is a top plan view of the body of the clamping device.

Figure 5 is a longitudinal section through the body of the clamping device.

Figure 6 is a perspective view of the collar used to hold the parts of the clamping device in assembled relation.

Figure 7 is a perspective view of the wedge device used for urging the jaws into engagement with the cable portions contained.

Figure 8 is a perspective view of one of the cable clamping jaws.

Figure 9 is a sectional view through a set screw of the type used in conjunction with my cable clamp.

Figure 10 is a perspective view of a detail portion of the clamp.

The cable clamp A includes a substantially frusto-conical body 10 having a substantially frusto-conical passage way 11 extending therethrough. Opposed grooves 12 and 13 are provided in the body 10 in communication with the passage way 11 therethrough. These grooves in the wall are provided with axially spaced teeth 14 designed to resist longitudinal movement of a cable portion clamped thereagainst.

As best seen in Figure 2 of the drawing the groove 13 may be somewhat longer than the groove 12, ending less abruptly than the groove 12 and blending more fully with the passage 11 through the clamp body 10. This groove 13 is designed to accommodate the portion of the cable B which extends entirely through the passage 11 from one end to the other thereof, while the groove 12 is arranged to accommodate a looped end 15 of the cable B. Obviously both grooves 12 and 13 may be similar if it is so desired.

A pair of jaws 16 and 17 engage the cable B on opposite sides of the longitudinal center of the body 10. These jaws 16 and 17 are substantially wedge-shaped in formation and include a flat inner surface 19 and a grooved outer surface 20, as best shown in Figure 8 of the drawing. The grooved surface 20 is provided with longitudinally spaced teeth 21, which resist longitudinal movement of the cable B with respect to the jaws.

The groove 20 is designed to engage against the inner surface of the portions of the cable B enclosed within the body of the cable clamp 10 so as to clamp the cable portions between the jaw 16 and the groove 12, and between the jaw 17 and the groove 13.

In order to clamp the cable B firmly within the body 10 I provide a clamping wedge 22, best illustrated in Figure 7 of the drawing. This clamping wedge includes a tapered wedge-shaped body 23 which is relatively narrow at its lower end, and relatively thicker at its upper extremity. When this wedge-shaped element 23 is forced between the flat surfaces 19 of the jaws 16 and 17 these jaws will be forced apart, forcing the teeth 21 against one surface of the cable B and forcing the other side of the cable B against the teeth 14 in the grooves 12 and 13. Thus when the wedge-shaped element 23 is in place the cable is firmly held against longitudinal movement.

Attached to the upper or thicker end of the wedge 23, I provide a washer disc 24 having a pair of notches 25 and 26 therein to accommodate the portions of the cable passing through the large diameter end of the clamp body 10. This washer 24 engages against the upper ends 27 of the wedge-shaped clamping element 16 and also the clamping element 17, preventing longitudinal movement of these clamping elements in one direction. A loop-shaped handle 29 is provided on the top of the washer 24 to simplify the removal of the wedge 23 from between the jaws 16 and 17 in the disassembly of the clamping device.

In order to hold the wedge 23 in place between the jaws 16 and 17, I provide a collar 30 which is internally threaded at 31 to fit the external threads 32 of the large diameter end of the clamp body 10. The sleeve 30 is provided with an inwardly extending shoulder 38 which engages against the washer 24 and holds the same in place. The portions of the cable B extending out of the large diameter end of the body 10 pass through the opening within the circular shoulder 38. However, when the collar 30 is in place the washer 24 is held firmly against the top of the clamping body holding the cable wedged securely in this body.

If it is desired, a pair of set screws 33 and 34 may be provided to engage against the cable and to more firmly hold the same. These set screws 33 and 34 are preferably of the type best illustrated in section in Figure 9 of the drawing. The set screws 33 and 34 comprise an externally threaded body 35 having a socket 36 therein, by means of which the set screws may be engaged by a suitable wrench. A plate 37 having an offset central portion 39 is provided against the end of the set screw 34. A head 40 is provided to hold the plate 37 rotatably engaged upon the set screw.

As the set screws 33 and 34 are tightened into place the plates 37 engage against the surface of the cable to clamp the same. As friction increases between the plate 37 and the cable this plate will be held from rotation with respect to the set screw, thereby not injuring the surface of the cable by cutting the fine wires of which such cable are often made. When the set screws 33 and 34 are in place they may be prevented from becoming loose by the collar 30 which may be threaded over the outer ends of the set screws. The upper end of the body 10 may contain a slit such as 41 on either side thereof to permit the upper end of the body 10 to spread slightly as the cable is clamped, thus holding the collar 30 firmly in place upon the body 10.

A series of angularly spaced lugs 42 may be provided on the outer surface of the body 10 in order to facilitate the tightening of the clamp. Due to the tapered shape of the body, this body would be somewhat difficult to engage with a wrench unless some means, such as the lugs 42 were provided for this purpose.

A reinforcing element C may act to reinforce the cable B at the point of bend thereof. This reinforcing element C comprises an actuated strip 43 engageable with the inner surface of the cable at the point of bend, and a pair of clamping bands 44 designed to encircle or partially encircle the cable B. This reinforcing element C prevents kinking of the cable and holds the cable in a bend which will not break the individual wires of which the cable is formed.

An elongated slot 46 is provided in the body 10, extending from a point near the threads 32 thereon to a point spaced from the small diameter end 45 of the body 10. A clamping bar 47 normally closes this slot 46. A projecting lip 49 on one end of the bar 47 engages within the passage way 11 to hold the lowered end of the clamping bar in place. An arcuated strip 50 extends to either side of the bar 47 at the upper end thereof. This arcuated strip is designed to overlie the outer surface of the body 10. Cap screws 51 extend through the strip 50 on either side of the clamping bar, engaging into the body 10 to hold the clamping bar 47 in position. The teeth 52 on the inner surface of the bar form an extension of the teeth 14 of the groove 12.

The operation of the device is believed obvious from the foregoing description. In attaching the cable clamp, the end of the cable is threaded through the passage way 11, the end of the cable being threaded through the small diameter end 45 of the body. The cable is then threaded through the collar 30 and a loop is formed in the cable. The cable end is then again inserted through the collar 30 in the reverse direction, and into the passage way 11. If slack is to be taken in the cable, the free end 15 thereof is extended through the slot 46. The free end may be pulled to take the slack out of the cable, if it is so desired.

When the cable is taut, the continuous portion of the cable B lies in the groove 13 while the free end 15 lies in the groove 12. The jaws 16 and 17 may then be inserted in position, and the wedge 23 placed therebetween. The set screws 33 and 34 may be tightened against the cable, these set screws being threaded into the body 10 to such an extent that the collar 30 may be threaded thereover. The collar 30 is then brought into engagement with the upper surface of the disk 24, and the collar 30 is threaded onto the body 10 forcing the wedge member 23 between the jaws 16 and 17, and clamping these jaws against the cable portions.

If the clamp is merely being secured to the end of a loose cable, the clamping bar may remain in place during the attachment. However, if the looped end 15 of the cable is longer than it should be, as when slack has been taken up in the cable, the cable end may extend through the slot 46 as shown in dotted outline in Figure 2. In this case the cable may be cut off to the proper length, and the clamping bar 47 inserted in place to close the slot 46. The projecting lip 49 is first inserted within the body 10, and the bar 47 may then be fastened in clamping position.

I have found that my cable clamp will effectively hold the end of a cable in loop formation, and that usually the cable will break before the cable clamp will become disengaged. A longitudinal pull on the cable B with respect to the body 10 will act to pull the jaw 17 farther into the body if any movement between the cable and the body takes place. Thus should the clamp slip to some extent under tension, the cable will be even more firmly clamped than before the start of the slipping operation.

In accordance with the patent statutes, I have described the principles of construction and operation of my cable clamp, and while I have endeavored to set forth the best embodiment thereof, I desire to have it understood that obvious changes may be made within the scope of the following claims without departing from the spirit of my invention.

I claim:

1. A cable clamp including a body having a substantially frusto-conical opening therethrough adapted to accommodate a cable extending therethrough and having a looped end extending into the large diameter end of said opening, a pair of spaced jaws freely mounted on lie between the portions of cable enclosed within said body, and wedge means between said jaws for urging said jaws apart.

2. A cable clamp including a body having a substantially frusto-conical opening therethrough, a pair of opposed grooves in said body communicating with said opening through said body adjacent the large diameter end thereof, said grooves being designed to receive a cable passing through said opening, looped and terminating within said body, a pair of freely mounted jaws between the portions of cable enclosed within said body, and wedge means for urging said jaws into engagement with said cable and for urging said cable into said grooves.

3. A cable clamp comprising a body having a substantially frusto-conical opening therethrough, said opening being designed to accommodate a cable passing therethrough and having an extreme end looped back into the large diameter end of said opening, a pair of freely mounted jaws between the portions of cable enclosed within said body, wedge means for urging said jaws apart, and set screw means for holding said cable against said jaws.

4. A cable clamp comprising a body having a substantially frusto-conical opening therethrough, said opening being designed to accommodate a cable passing therethrough from the small diameter end, and having a looped end extending into the large diameter end of said body, a pair of jaws between the portions of said cable within said body, wedge means for urging said jaws into engagement with said cable, set screw means in said body designed to engage against said cable, and rotatable plate means supported by said set screw means, said plates comprising bearing plates to bear against said cable.

5. A cable clamp comprising an elongated body having a substantially frusto-conical opening therethrough, said opening being designed to accommodate a cable passing through said opening, looped, and having an end extending back into said opening, a pair of jaws between the portions of said cable enclosed within said elongated body, wedge means engageable between said jaws to spread said jaws apart into engagement with said cable, and a disc element integral with said wedge engageable over said jaw.

6. A cable clamp including an elongated body having an opening therethrough, said opening being designed to accommodate a cable passing therethrough and to accommodate the looped end of the cable extending back into the opening, a pair of jaws between the portions of the cable within said body, a wedge engageable between said jaws to urge the same apart, a washer means integral with said wedge and engageable over the ends of said jaws, and a threaded collar means arranged to clamp said washer means against the end of said body.

7. A cable clamp comprising an elongated body having an opening therethrough, said opening being designed to accommodate a cable passing therethrough and to accommodate the looped end of the cable extending thereinto, wedge means for urging said cables apart, threaded nut means on said body engageable with said wedge means to operate the same, and a loop handle secured to said wedge means for facilitating the removal of said wedge means.

8. A cable clamp comprising an elongated body having an opening therethrough designed to accommodate a cable passing through said body and to accommodate the looped end of the cable extending back into the opening, wedge means for urging said cables apart, a washer integral with said wedge means, a sleeve engageable with said washer means to urge said wedge means between said cables, said sleeve being threadably connected to said body.

9. A cable clamp comprising an elongated body having an opening therethrough through which a cable may extend, said opening being also designed to accommodate the looped end of the cable, wedge means for urging said cables apart, set screw means for urging said cables together, and collar means engageable with said wedge means to urge said wedge means between the portions of the cable enclosed within said body, said collar being engageable over said set screw means to prevent removal thereof.

10. A cable clamp including an elongated body having an opening therethrough through which the cable may extend and into one end of which the looped end of the cable may extend, jaws having arcuated surfaces engageable with each of the portions of said cable enclosed within said body, a freely mounted wedge engageable between said jaws to urge said jaws against said cable, and a sleeve threadably secured to said body engageable with said wedge to force the same between said jaws.

11. A cable clamp including a body having a substantially frusto-conical opening therethrough adapted to accommodate a cable extending through said opening and having a looped end extending into the large diameter end of said openings, a slot in said body communicating with said opening through which the looped end of the cable may extend, and freely mounted wedge means between the cable portions in said frusto-conical opening for urging said cable portions against said body.

12. A cable clamp including a body having an opening therethrough adapted to accommodate a cable extending through said opening and having a looped end extending back into said opening, freely mounted wedge means between the portions of said cable within said opening to urge said portions against said body, a slot in said body communicating with said opening, and means normally closing said slot.

BOLESLAW JASZCZAK.